United States Patent
Kang et al.

(10) Patent No.: US 8,460,936 B2
(45) Date of Patent: Jun. 11, 2013

(54) APPARATUS AND METHOD OF MEASURING CONCENTRATION OF FUEL

(75) Inventors: Ku-Yen Kang, Hsinchu (TW); Chiou-Chu Lai, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 540 days.

(21) Appl. No.: 12/357,408

(22) Filed: Jan. 22, 2009

(65) Prior Publication Data

US 2010/0136697 A1 Jun. 3, 2010

(30) Foreign Application Priority Data

Dec. 1, 2008 (TW) ............................... 97146627 A

(51) Int. Cl.
*G01N 33/00* (2006.01)
*B01J 19/00* (2006.01)

(52) U.S. Cl.
USPC ................................. 436/34; 422/83; 422/50

(58) Field of Classification Search
USPC ........................................ 436/34; 422/83, 50
See application file for complete search history.

(56) References Cited

U.S. PATENT DOCUMENTS

| | | | |
|---|---|---|---|
| 6,488,837 B1 | 12/2002 | Ren et al. | |
| 6,589,671 B1 | 7/2003 | Kehrer | |
| 6,589,679 B1 | 7/2003 | Acker et al. | |
| 6,698,278 B2 | 3/2004 | Zhang et al. | |
| 2002/0015868 A1* | 2/2002 | Surampudi et al. | 429/15 |
| 2002/0076589 A1 | 6/2002 | Bostaph et al. | |
| 2003/0196913 A1 | 10/2003 | Xie et al. | |
| 2004/0131919 A1* | 7/2004 | Yasumoto et al. | 429/42 |
| 2007/0077469 A1* | 4/2007 | Fukuda et al. | 429/24 |

FOREIGN PATENT DOCUMENTS

| | | |
|---|---|---|
| CN | 1446385 | 10/2003 |
| JP | 01-305353 | 12/1989 |
| JP | 11-001302 | 1/1999 |
| JP | 2000-213724 | 8/2000 |
| JP | 2001-074727 | 3/2001 |
| JP | 2004-507053 | 3/2004 |
| JP | 2005-026215 | 1/2005 |
| JP | 2007-294334 | 11/2007 |

(Continued)

OTHER PUBLICATIONS

Wang et al. "A direct methanol fuel cell using acid-doped polybenzimidazole as polymer electrolyte". 1996. Journal of Applied Electrochemistry. vol. 26, pp. 751-756.*
"Office Action of Taiwan counterpart application" issued on Jun. 22, 2012, p. 1-p. 5, in which the listed reference was cited.
"Office Action of Japan counterpart application", issued on Jan. 4, 2011, pp. 1-2, in which the listed references were cited.

(Continued)

*Primary Examiner* — Christine T Mui
(74) *Attorney, Agent, or Firm* — Jianq Chyun IP Office

(57) ABSTRACT

An apparatus of measuring concentration of fuel including a catalyst layer, a diffusion layer, a fuel chamber, a reactive gas chamber, and a sensor is provided. The diffusion layer is connected to the catalyst layer. The fuel chamber is suitable for containing a fuel. The diffusion layer is between the fuel chamber and the catalyst layer. The reactive gas chamber is suitable for containing a reactive gas. The catalyst layer is between the reactive gas chamber and the diffusion layer. The fuel diffuses to the catalyst layer via the diffusion layer such that a combustion reaction of the fuel and the reactive gas is conducted in the catalyst layer to consume the reactive gas and generate a gaseous product. The sensor is disposed on the reactive gas chamber for measuring the concentration of the reactive gas or the concentration of the gaseous product in the reactive gas chamber.

12 Claims, 3 Drawing Sheets

FOREIGN PATENT DOCUMENTS

| | | |
|---|---|---|
| JP | 2008-052924 | 3/2008 |
| TW | I251954 | 3/2006 |
| TW | I282639 | 6/2007 |
| WO | 0135478 | 5/2001 |
| WO | 2007107833 | 9/2007 |

OTHER PUBLICATIONS

"1st Office Action of China Counterpart Application", issued on Jan. 19, 2011, p. 1-p. 6, in which the listed reference was cited.

* cited by examiner

APPARATUS AND METHOD OF MEASURING CONCENTRATION OF FUEL

CROSS-REFERENCE TO RELATED APPLICATION

This application claims the priority benefit of Taiwan application serial no. 97146627, filed on Dec. 1, 2008. The entirety of the above-mentioned patent application is hereby incorporated by reference herein and made a part of specification.

BACKGROUND OF THE INVENTION

1. Field of the Invention

The present invention relates to an apparatus and a method of measuring concentration of fuel, and more particularly to, an apparatus and a method capable of measuring concentration of fuel easily and precisely.

2. Description of Related Art

With the rapid development of industry, the consumption of conventional energy source such as coal, petroleum, and natural gas is increasingly high, and due to the limited storage of natural energy source, novel alternative energy source may be researched and developed to substitute the conventional energy source, and the fuel cell is taken as an important and practical choice.

In brief, the fuel cell is substantially a power generator that converts chemical energy into electric energy by utilizing the reverse reaction of the water electrolysis. The proton exchanging membrane fuel cell mainly includes a membrane electrode assembly (MEA) and two electrode plates. The MEA includes a proton conducting membrane, an anode catalyst layer, a cathode catalyst layer, an anode gas diffusion layer (GDL) and a cathode GDL. The anode catalyst layer and the cathode catalyst layer are respectively disposed on two sides of the proton conducting membrane, and the anode GDL and the cathode GDL are respectively disposed on the anode catalyst layer and the cathode catalyst layer. Furthermore, two electrode plates include an anode and a cathode, which are respectively disposed on the anode GDL and the cathode GDL.

Currently, the common proton exchanging membrane fuel cell is Direct Methanol Fuel Cell (DMFC), which directly takes the methanol aqueous solution as the source for supplying fuel, and generates currents through the relevant electrode reaction between methanol and oxygen. The reaction formulas of the DMFC are shown as follows:

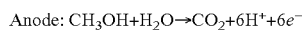
Anode: $CH_3OH+H_2O \rightarrow CO_2+6H^++6e^-$

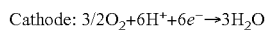
Cathode: $3/2O_2+6H^++6e^- \rightarrow 3H_2O$

In the conventional DMFC, the output stability of the DMFC is significantly influenced by the concentration of the methanol aqueous solution conducted to the anode. When the concentration of the methanol aqueous solution conducted to the anode is not properly controlled, not only efficiency and output power of the DMFC is unstable, but also the membrane electrode assembly (MEA) may be damaged. Accordingly, how to control the concentration of the methanol aqueous solution conducted to the anode within an optimized range is a key issue being researched and developed in this field.

The concentration of the fuel may be controlled by the following steps. First, the concentration of the fuel is measured through sensors directly, and amount of fuel and water are supplied to the DMFC is determined in accordance with the measured concentration. Such manner has already discussed in U.S. Pat. No. 6,589,671 B1, U.S. Pat. No. 6,488,837, US 2002/076589 A1, US 2003/0196913 A1, and WO 01/35478. It is noted that the membrane electrode assembly (MEA) disclosed in U.S. Pat. No. 6,488,837 and US 2003/0196913 A1 is used as sensors to measure the concentration of the methanol aqueous solution directly. In the above-mentioned method, precision of measurement is influenced by the impurities in fuel. Additionally, precision of measurement may also be influenced by aging or instability of the membrane electrode assembly (MEA).

In some prior arts (e.g. U.S. Pat. No. 6,698,278 B2), the concentration of fuel is estimated by measuring temperature and current of the DMFC. In the above-mentioned method, the concentration of fuel is measured without sensors. However, when the method described in U.S. Pat. No. 6,698,278 B2 is applied to different fuel cell systems, a proper calibration is necessary to estimate the concentration of fuel. Other measurements of fuel concentration without using sensors are illustrated in U.S. Pat. No. 6,589,679 and TW 94119975.

Since the concentration of methanol aqueous solution is relevant to the physical properties (e.g. velocity of sound transmitted in methanol aqueous solution, dielectric constant or density of fuel, and so on), some prior arts estimate the concentration of methanol aqueous solution by measuring velocity of sound transmitted in methanol aqueous solution, or estimate the concentration of fuel by measuring dielectric constant or density of fuel (TWI 251954). However, sensors used in the above-mentioned estimation of concentration are very expensive and the precision of the sensors is significantly influenced by bubbles in fuel. Therefore, it is difficult to measure physical properties of fuel precisely because the fuel sampled by the sensors must be static and has no bubbles therein when measuring.

In the conventional measurements of fuel, the concentration of fuel is hard to measure. Additionally, cost of measurements is high and precision of measurements is unstable. Accordingly, a simple and precise method of measuring concentration of fuel is needed.

SUMMARY OF THE INVENTION

The present invention is directed to a cost effective apparatus of measuring concentration of fuel, wherein the apparatus is stable when measuring.

The present invention is directed to a method of measuring concentration of fuel, wherein the method is simple, low-cost, and stable.

As embodied and broadly described herein, an apparatus of measuring concentration of fuel is provided. The apparatus of measuring concentration of fuel comprises a catalyst layer, a diffusion layer, a fuel chamber, a reactive gas chamber, and a sensor. The diffusion layer is connected to the catalyst layer. The fuel chamber is suitable for containing a fuel to be measured. The diffusion layer is located between the fuel chamber and the catalyst layer. The reactive gas chamber is suitable for containing a reactive gas. The catalyst layer is located between the reactive gas chamber and the diffusion layer, wherein the fuel to be measured in the fuel chamber diffuses to the catalyst layer via the diffusion layer such that a combustion reaction of the fuel to be measured and the reactive gas is conducted in the catalyst layer so as to consume the reactive gas in the reactive gas chamber and generate a gaseous product. The sensor is disposed on the reactive gas chamber to measure concentration of the reactive gas in the reactive gas chamber or concentration of the gaseous product.

As embodied and broadly described herein, a method of measuring concentration of fuel is provided. First, the above-mentioned apparatus of measuring concentration of fuel is provided. Then, a fuel to be measured is supplied to the fuel chamber and a reactive gas is supplied to the reactive gas chamber. Thereafter, concentration of the fuel to be measured is estimated in accordance with consumption rate of the reactive gas in the reactive gas chamber or generation rate of the gaseous product after an amount of the reactive gas supplied to the reactive gas chamber is modulated.

To make the above and other objectives, features, and advantages of the present invention more comprehensible, several embodiments accompanied with figures are detailed as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

First Embodiment

Figure 1A:
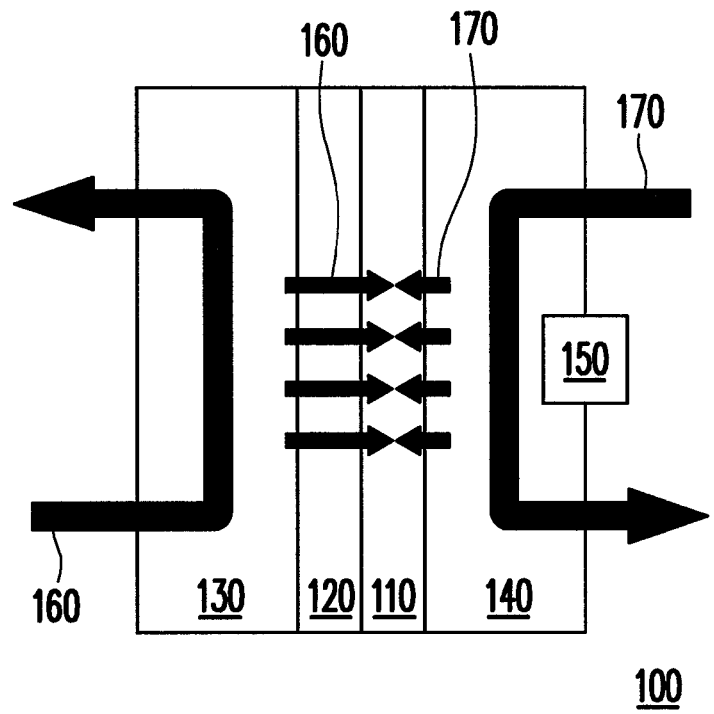
FIG. 1A and FIG. 1B are schematic views illustrating the method of measuring concentration of fuel in accordance with the first embodiment of the present invention.
Figure 1B:
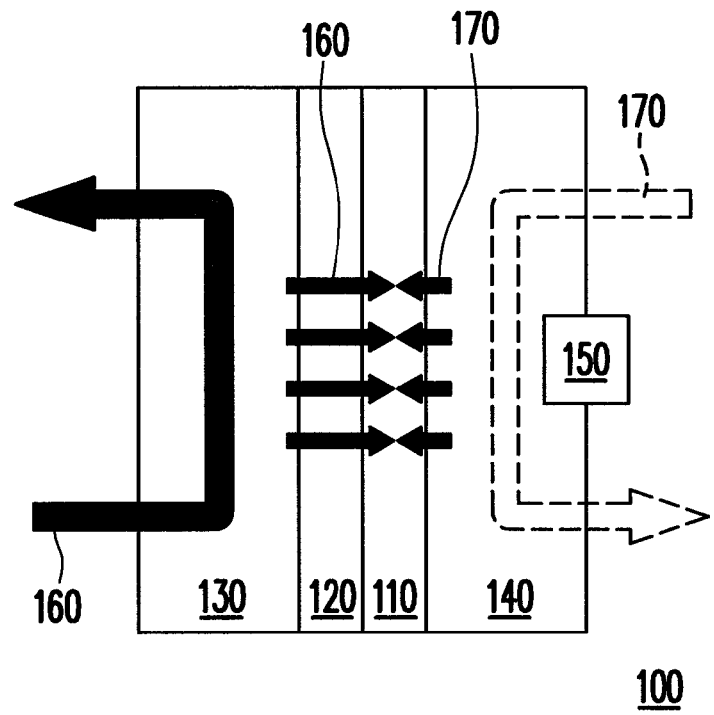

FIG. 1A and FIG. 1B are schematic views illustrating the method of measuring concentration of fuel in accordance with the first embodiment of the present invention. Referring to FIG. 1A, an apparatus of measuring concentration of fuel 100 is provided first. The apparatus of measuring concentration of fuel 100 includes a catalyst layer 110, a diffusion layer 120, a fuel chamber 130, a reactive gas chamber 140, and a sensor 150. The diffusion layer 120 is connected to the catalyst layer 110. The fuel chamber 130 is suitable for containing a fuel 160 to be measured. The diffusion layer 120 is located between the fuel chamber 130 and the catalyst layer 110. The reactive gas chamber 140 is suitable for containing a reactive gas 170. The catalyst layer 110 is located between the reactive gas chamber 140 and the diffusion layer 120. The sensor 150 is disposed on the reactive gas chamber 140 to measure concentration of the reactive gas 170 in the reactive gas chamber 140. It is noted that one ordinary skilled in the art can choose suitable sensors 150 in accordance with the variation of reactive gas 170 to be measured. The type of the sensor 170 is not limited in the present invention.

In the present embodiment, the material of the catalyst layer 110 may be Pt catalyst, high activation catalyst or adhesive. The thickness of the catalyst layer 110 is between 1 micrometer and 50 micrometer, for example. The material of the diffusion layer 120 includes ceramic, polymer, or other materials allow fuel (methanol) to pass through. The thickness of the diffusion layer 120 is between 10 micrometer and 1000 micrometer, for example. Additionally, volume of the reactive gas chamber 140 is between 0.1 cubic centimeter and 100 cubic centimeter, for example. It is noted that volume of the reactive gas chamber 140 can be modified in accordance with concentration of the fuel 160 to be measured, thickness or diffusion coefficient of the diffusion layer 120. The above-mentioned dimension is only for illustration. Specifically, when the fuel 160 having higher concentration is measured, reactive gas chamber 140 having greater volume is suggested so as to obtain better sensitivity. On the contrary, when the fuel 160 having lower concentration is measured, reactive gas chamber 140 having smaller volume is suggested so as to save time for measurement.

Then, a fuel 160 to be measured is supplied to fuel chamber 130 in the apparatus of measuring concentration of fuel 100, and a reactive gas 170 is supplied to the reactive gas chamber 140 in the apparatus of measuring concentration of fuel 100. In the present embodiment, the fuel 160 supplied to the fuel chamber 130 is a methanol aqueous solution having uncertain concentration. In an alternate embodiment, the fuel 160 supplied to the fuel chamber 130 may be other type of fuel such as an ethanol aqueous solution or formic acid aqueous solution. One ordinary skilled in the art can choose suitable fuel and catalyst in accordance with actual requirements. Besides, the reactive gas 170 is supplied to the reactive gas chamber 140 is air, oxygen, or other suitable gases. When the fuel 160 and the reactive gas 170 are supplied to the apparatus of measuring concentration of fuel 100, a portion of the fuel 160 in the fuel chamber 130 diffuses to the catalyst layer 110 via the diffusion layer 120, and the reactive gas 170 enters the catalyst layer 110 also. A combustion reaction of the fuel 160 and the reactive gas 170 is conducted in the catalyst layer 110 to consume the reactive gas 170 and generate a gaseous product (e.g. carbon dioxide). The formula of the above-described combustion reaction is as following.

$$3/2 O_2 + CH_3OH \rightarrow CO_2 + 2H_2O$$

Referring to FIG. 1B, amount of the reactive gas 170 supplied to the reactive gas chamber 140 can be modulated by switching valve (not shown) or other components capable of controlling flow rate of the reactive gas 170 so as to reduce amount the reactive gas 170 supplied to the reactive gas chamber 140. In a preferred embodiment, the reactive gas 170 supplied to the reactive gas chamber 140 is cut when starting to measure concentration of fuel 160. Amount of the fuel 160 arriving in the catalyst layer 110 per unit time is proportional to concentration of the fuel 160 to be measured, and consumption rate of the reactive gas 170 in the reactive gas chamber 140 is relevant to the amount of the fuel 160 arriving in the catalyst layer 110 per unit time. Accordingly, concentration of the fuel 160 can be estimated by measuring consumption rate of the reactive gas 170 in the reactive gas chamber 140. Specifically, when the reactive gas 170 supplied to the reactive gas chamber 140 is modulated (reduced or cut), a combustion reaction of the reactive gas 170 and the fuel 160 is conducted in the catalyst layer 110 such that the reactive gas 170 is consumed gradually. Accordingly, concentration of the fuel 160 can be estimated in accordance with consumption rate of the reactive gas 170 in the reactive gas chamber 140.

In the above-mentioned embodiment, the sensor 150 is used to measure concentration of the reactive gas 170 such that consumption rate of the reactive gas 170 is estimated accordingly. Additionally, since consumption rate of the reactive gas 170 is proportional to generation rate of the gaseous product (e.g. carbon dioxide), a sensor for measuring concentration of the gaseous product can be adapted so as to estimate generation rate of the gaseous product. In the present embodiment, the sensor 150 is a sensor for measuring concentration of carbon dioxide. In this way, increasing rate of concentration of carbon dioxide is calculated in accordance with outputs of the sensor 150 such that concentration of the fuel 160 is estimated accordingly. In an alternate embodiment, the time when concentration of carbon dioxide reaches a predetermined value can be used to estimate concentration of the fuel 160.

In the present embodiment, when the reactive gas 170 supplied to the reactive gas chamber 140 is cut, concentration variation rate (i.e. consumption rate) of the reactive gas 170 in the reactive gas chamber 140 is highly relevant to the fuel 160 to be measured. Specifically, when the fuel 160 has high concentration, large amount of the fuel 160 diffuses from the fuel chamber 130 to the catalyst layer 110 per unit time. At this time, consumption rate of the reactive gas 170 is high. On the contrary, when the fuel 160 has low concentration, small amount of the fuel 160 diffuses from the fuel chamber 130 to the catalyst layer 110 per unit time. At this time, consumption rate of the reactive gas 170 is low. It is noted that amount of the reactive gas 170 in the reactive gas chamber 140 is substantially equal to volume of the reactive gas chamber 140 when stopping to supply the reactive gas 170 to the reactive gas chamber 140.

Since concentration of fuel 160 to be measured is relevant to consumption rate of the reactive gas 170, concentration of the reactive gas 170 in the reactive gas chamber 140 can be measured through the sensor 150 directly, and concentration of fuel 160 can be estimated rapidly in accordance with consumption rate of the reactive gas 170.

Experimental Example

In this experimental example, the fuel is methanol aqueous solution, the reactive gas is air, the sensor is a sensor for measuring concentration of oxygen, volume of the reactive gas chamber is about 5 cubic centimeters, and concentration of the methanol aqueous solution is 1%, 4%, 7%, and 10%.

Figure 2:
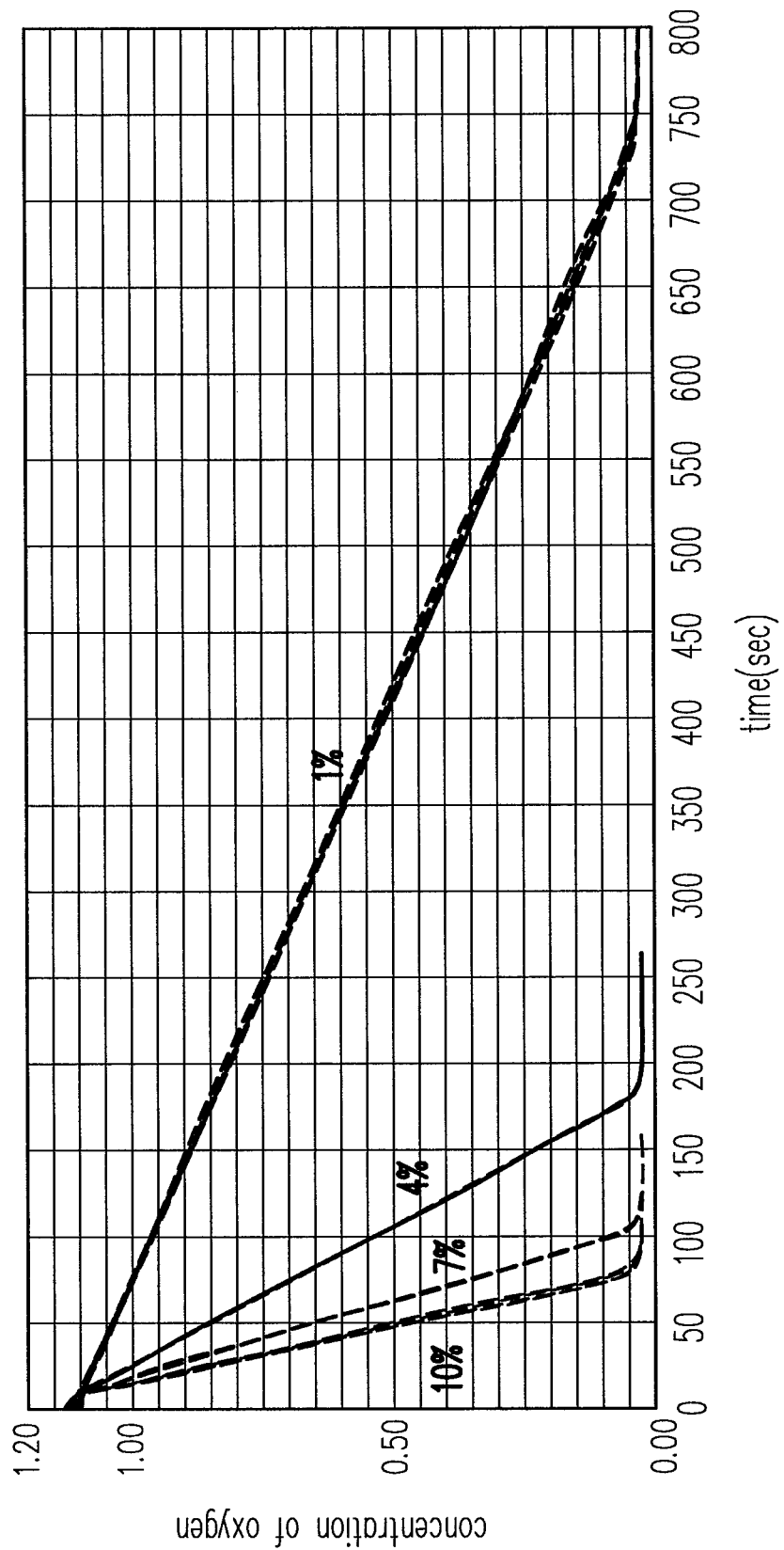
FIG. 2 is a diagram of the relationship between concentration of oxygen and time when concentration of fuel is 1%, 4%, 7%, and 10%.

FIG. 2 is a diagram of the relationship between concentration of oxygen and time when concentration of fuel is 1%, 4%, 7%, and 10%. Referring to FIG. 2, when concentration of methanol aqueous solution is 1%, 4%, 7%, and 10%, consumption rates of the reactive gas are quite different. Additionally, curves corresponding to the methanol aqueous solutions having the same concentration are very close, and curves corresponding to the methanol aqueous solutions having different concentration are identified easily. Accordingly, concentration of the methanol aqueous solution can be estimated easily and precisely from curves in FIG. 2.

In this experimental example, concentration of the fuel to be measured can be estimated in accordance with the time when concentration of reactive gas decreases to a predetermined value. However, the estimation of concentration of the fuel is not limited by the above mentioned embodiment and experimental example. Concentration of the fuel can be estimated in accordance with decreasing rate of concentration of reactive gas.

Second Embodiment

Figure 3:
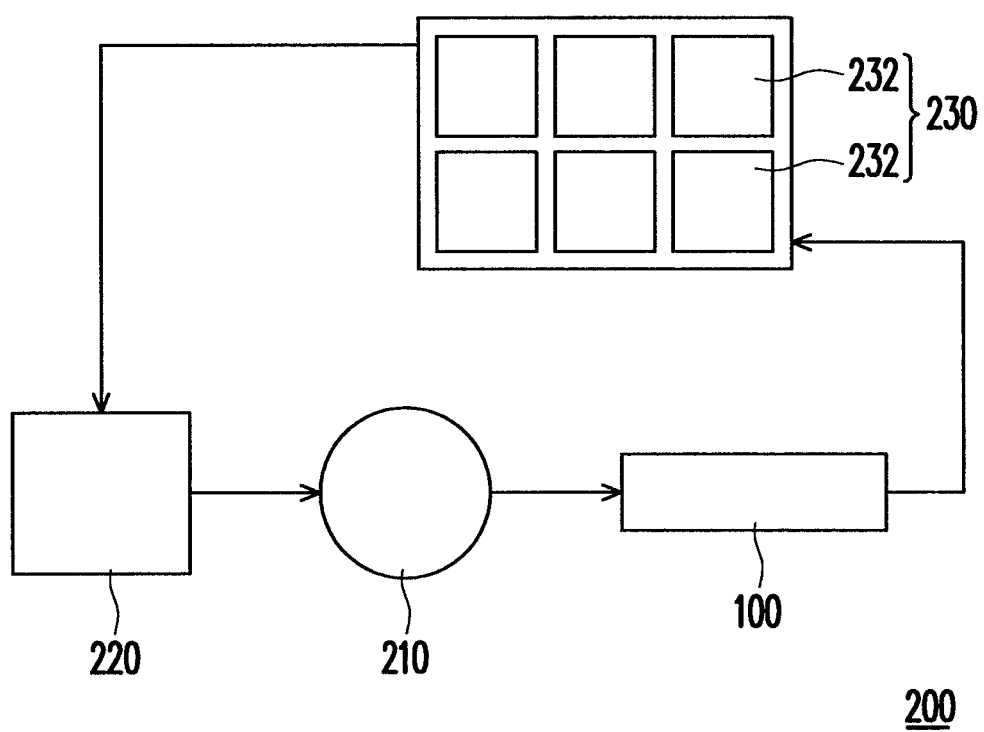
FIG. 3 is a schematic view illustrating an apparatus of measuring concentration of fuel applied to a fuel cell system.

FIG. 3 is a schematic view illustrating an apparatus of measuring concentration of fuel applied to a fuel cell system. Referring to FIG. 3, the fuel cell system 200 of the present invention includes the above-described apparatus of measuring concentration of fuel 100, a fuel circulating apparatus 210, a fuel storage tank 220, and a fuel cell module 230. The fuel circulating apparatus 210 is used to transmit fuel from the fuel storage tank 220 to the apparatus of measuring concentration of fuel 100, and the fuel cell module 230. In the present embodiment, the fuel cell module 230 includes one or more fuel cell unit 232, and each of the fuel cell unit 232 is a direct methanol fuel cell (DMFC) unit. One ordinary skilled in the art can choose suitable fuel cell unit 232 in accordance with actual requirements. The type of the fuel cell is not limited in the present invention.

Since the present invention uses the sensor to measure concentration of reactive gas in the reactive gas chamber or concentration of the gaseous product directly so as to estimate consumption rate of the reactive gas or generation rate of the gaseous product, concentration of the fuel to be measured can be precisely judged. Therefore, the method and the apparatus of measuring concentration of the fuel are simple and precise. Additionally, concentration measurements of the fuel in the present invention are quite stable, and the measurements are not influenced by flow of fuel, bubbles in the fuel, impurities in the fuel, aging of the membrane electrode assembly (MEA), and so on.

Although the present invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. A method of measuring concentration of liquid state organic fuel, comprising:
providing an apparatus of measuring concentration of liquid state organic fuel, the apparatus comprising: a catalyst layer; a diffusion layer, coated with the catalyst layer; a fuel chamber for containing the liquid state organic fuel having an unknown concentration, wherein the diffusion layer is located between the fuel chamber and the catalyst layer; a reactive gas chamber for containing a reactive gas, wherein the catalyst layer is located between and is directly connected with the reactive gas chamber and the diffusion layer, the liquid state organic fuel having the unknown concentration in the fuel chamber diffuses from the diffusion layer to the catalyst layer, a combustion reaction of the liquid state organic fuel having the unknown concentration and the reactive gas is conducted in the catalyst layer so as to consume the reactive gas in the reactive gas chamber and generate a gaseous product; and a sensor disposed on the reactive gas chamber to measure concentration of the reactive gas in the reactive gas chamber;
establishing at least one first reactive gas concentration vs. time curve, the first reactive gas concentration vs. time curve is corresponding to a liquid state organic fuel having one known concentration;
supplying a liquid state organic fuel having the unknown concentration to the fuel chamber;
supplying the reactive gas to the reactive gas chamber;
stopping the supply of the reactive gas to the reactive gas chamber and measuring the concentration of the reactive gas in the reactive gas chamber so as to obtain a second reactive gas concentration vs. time curve; and
estimating the concentration of the liquid state organic fuel having the unknown concentration in accordance with a relationship between the second reactive gas concentration vs. time curve and the first reactive gas concentration vs. time curve.

2. The method of claim 1, wherein estimating the concentration of the liquid state organic fuel having the unknown concentration comprising:
measuring the concentration of the reactive gas through the sensor in the reactive gas chamber directly; and comparing the second reactive gas concentration vs. time curve with the first reactive gas concentration vs. time curve.

3. The method of claim 2, wherein the concentration of the liquid state organic fuel having the unknown concentration is estimated in accordance with a time when concentration of reactive gas decreases to a predetermined value.

4. The method of claim 2, wherein the concentration of the liquid state organic fuel having the unknown concentration is estimated in accordance with a decreasing rate of concentration of reactive gas.

5. A method of measuring concentration of liquid state organic fuel, comprising:
  providing an apparatus of measuring concentration of liquid state organic fuel, the apparatus comprising: a catalyst layer; a diffusion layer, coated with the catalyst; a fuel chamber for containing the liquid state organic fuel having an unknown concentration, wherein the diffusion layer is located between the fuel chamber and the catalyst layer; a reactive gas chamber for containing a reactive gas, wherein the catalyst layer is located between and is directly connected with the reactive gas chamber and the diffusion layer, the liquid state organic fuel having the unknown concentration in the fuel chamber diffuses from the diffusion layer to the catalyst layer, a combustion reaction of the liquid state organic fuel having the unknown concentration and the reactive gas is conducted in the catalyst layer so as to consume the reactive gas in the reactive gas chamber and generate a gaseous product; and a sensor disposed on the reactive gas chamber to measure concentration of the gaseous product;
  establishing at least one first gaseous product concentration vs. time curve, the first gaseous product concentration vs. time curve is corresponding to a liquid state organic fuel having one known concentration,
  supplying a liquid state organic fuel having the unknown concentration to the fuel chamber;
  supplying the reactive gas to the reactive gas chamber;
  stopping the supply of the reactive gas to the reactive gas chamber and measuring concentration of the gaseous product so as to obtain a second gaseous product concentration vs. time curve; and
  estimating the concentration of the liquid state organic fuel having the unknown concentration in accordance with a relationship between the second gaseous product concentration vs. time curve and the first gaseous product concentration vs. time curve.

6. The method of claim 5, wherein the concentration of the liquid state organic fuel having the unknown concentration is estimated in accordance with an increasing rate of concentration of gaseous product.

7. The method of claim 1, wherein the reactive gas comprises air or oxygen.

8. The method of claim 1, wherein the liquid state organic fuel having the unknown concentration of a methanol aqueous solution, an ethanol aqueous solution, or a formic acid aqueous solution.

9. The method of claim 5, wherein estimating the concentration of the liquid state organic fuel having the unknown concentration comprising:
  measuring concentration of the gaseous product through the sensor directly; and
  comparing the second gaseous product concentration vs. time curve with the first gaseous product concentration vs. time curve, so to estimate the concentration of the liquid state organic fuel having the unknown concentration.

10. The method of claim 5, wherein the concentration of the liquid state organic fuel having the unknown concentration is estimated in accordance with a time when concentration of gaseous product increases to a predetermined value.

11. The method of claim 5, wherein the step of establishing each of the first gaseous product concentration vs. time curve comprising:
  supplying the liquid state organic fuel having one known concentration to the fuel chamber;
  supplying a reactive gas to the reactive gas chamber; and
  stopping supplying the reactive gas to the reactive gas chamber and measuring concentration of the gaseous product so as to obtain the first gaseous product concentration vs. time curve.

12. The method of claim 1, wherein the step of establishing each of the first reactive gas concentration vs. time curve comprising:
  supplying the liquid state organic fuel having one known concentration to the fuel chamber;
  supplying a reactive gas to the reactive gas chamber; and
  stopping supplying the reactive gas to the reactive gas chamber and measuring concentration of the reactive gas in the reactive gas chamber so as to obtain the first reactive gas concentration vs. time curve.

* * * * *